Nov. 28, 1944.  E. ERNST  2,363,780
FLAT TYPE WATER LEVEL GAUGE ASSEMBLY
Filed Sept. 20, 1944
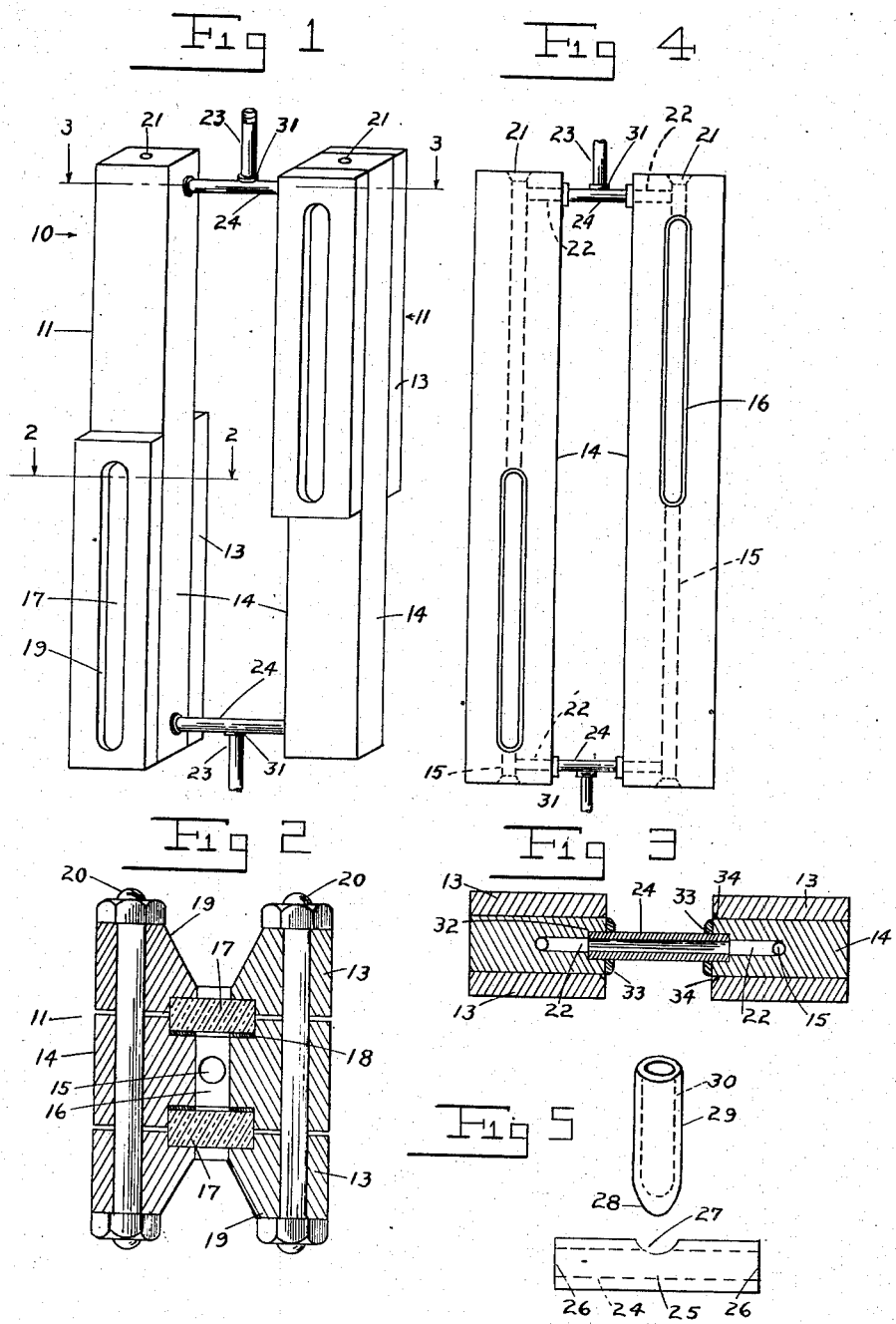
INVENTOR
EUGENE ERNST
BY
ATTORNEY Patented Nov. 28, 1944

2,363,780

UNITED STATES PATENT OFFICE 2,363,780

FLAT TYPE WATER LEVEL GAUGE ASSEMBLY

Eugene Ernst, Livingston, N. J.

Application September 20, 1944, Serial No. 554,877

3 Claims. (Cl. 73—329)

This invention relates to offset, flat type water level gauges.

One object of the invention is to provide an improvement in the art of constructing offset, flat type water level gauges for obtaining increased compactness, and reduced cost of manufacture.

It is well known that offset, flat type water level gauges used for extreme high pressure boilers are very expensive and massive, whereas the room available for mounting such gauges is always rather limited owing to various parts and equipment at the water column of the boiler. For example, the center to center distance between the water column fittings to which the gauge is connected is so limited that there is little room for shut-off valves or other parts that are often provided at the ends of the gauge. Therefore it is desirable to construct a gauge which shall require a minimum of vertical space and which is preferably attachable to shut-off valves that are already present at the water column. In manufacture, the various plates of a flat water level gauge require a lot of precision machining, and this together with the heavy plate glasses and special gaskets renders such a gauge very expensive. The assembling together of the gauge units in a single gauge with all joints absolutely leakproof at extreme steam pressures has also posed a problem from the standpoint of cost and alinement of the parts.

It is, therefore, another object of the invention to avoid these difficulties and to attain the advantages indicated.

The cheapest way of manufacturing offset, flat type water level gauges is to construct separate identical or interchangeable gauge units. Those skilled in the art have devised various ways of interconnecting the same in circulatory relation with each other, but these have invariably led to certain complications, and in any event did not realize the cheapness and simplicity of the instant device.

It is, therefore, another object of the invention to provide an offset, flat type of water level gauge wherein the gauge units are spaced relatively closely alongside of each other and are interconnected in a permanent, rigid manner without requiring special fittings or precision alinement of threaded members.

Other objects and advantages of the invention will become apparent as the specification proceeds.

With the aforesaid objects in view, the invention comprises the novel features, combinations and arrangements of parts hereinafter described in their preferred embodiments, pointed out in the subjoined claims, and illustrated in the annexed drawing, wherein like parts are designated by the same reference characters throughout the several views.

In the drawing:

Figure 1 is an isometric view showing a gauge embodying the invention.

Fig. 2 is an enlarged sectional view taken on line 2—2 of Fig. 1.

Fig. 3 is an enlarged sectional view taken on line 3—3 of Fig. 1.

Fig. 4 is a view in vertical elevation of the center plates as assembled before the gauge units are assembled.

Fig. 5 is a view of certain connector parts prior to being welded in place.

The advantages of the invention as here outlined are best realized when all of its features and instrumentalities are combined, but, useful embodiments may be produced involving less than the whole.

It will be obvious to those skilled in the art to which the invention appertains, that the same may be incorporated in several different constructions. The accompanying drawing, therefore, is submitted merely as showing a preferred exemplification of the invention.

Referring in detail to the drawing, 10 denotes an offset, flat type water level gauge embodying the invention. The same preferably comprises a plurality of identical gauge units 11, each having a plurality of like cover plates 13 between which is located a central plate 14. The latter may have a central longitudinal passage 15 a portion of which is slotted at 16 to form a water level chamber that is closed by special quality heavy glass plates 17 seating on gaskets 18. Slots 19 in the cover plates form sight openings for the water level, and bolts 20 conventionally spaced throughout the length of the gauge units (but omitted in Fig. 1) clamp the plates 11 and 13 powerfully together to assure that the glasses 17 shall have leakproof engagement with the chamber 16. At the extreme ends of the passages 15, the same are closed by plugs 21 that are screwed and welded in place.

It is to be noted that each center plate 14 extends for a substantial distance beyond an end of its water level chamber 16 and its cover plates 13, the passages 15 being formed continuously therethrough. Thus when the gauge units are assembled, the upper and lower ends of their center plates lie at the same elevations, and hence lateral passages 22 therein communicating with the passages 15 lie in alinement with each other.

Interconnecting the gauge units 11 in a rigid, permanent manner are the special T-shaped connections or fittings 23. The same may be identical for the top and bottom of the gauge 10; they connect the gauge units in circulatory relation to each other and serve to mount the gauge on the water column of the boiler. Each connector 23 comprises a horizontal tube or nipple 24 preferably made of round bar stock and having a central bore 25 formed by drilling. Intermediate of its ends 26, the tube 24 may have an opening 27 adapted to fit and shaped to conform to the end 28 of a tube 29 which may be made of round stock like the tube 24 or of extra heavy pipe. The opposite end of the tube 29 is threaded at 30. These tubes 24 and 29 are fitted together at 27, 28 and are connected together by a deep, powerful weld at 31 to thus produce the T-fitting 23, and then the end portions 26 are inserted into alined passages 22, which may be counterbored at 32 to afford an enlarged opening for receiving the tube 24. Finally the tubes 24 are each connected at its end to the plates 14 by a deep powerful weld at 33.

Another method of manufacture is to weld the tubes 24 to the center plates 14 before welding the tubes 29 in place. Hence the tubes 29 would offer no obstruction to the welding torch and the gauge units 11 could be spaced quite closely together with the tubes 24 being correspondingly short. The openings 27 could be alined with the vertical or the tubes 24 could be made of square stock to assist in such alining, with the end portions rounded off to fit the bores 32 in the plates 14. Finally the tubes 29 can be welded to the tubes 24 as before described.

It will be perceived that no precision work is involved in making the tubes 24 and in connecting the same in placing, as they are virtually self-alining, and when once welded in place are rigid. The same remarks apply to the tubes 29. It is merely necessary to line up the center plates 14 with some degree of accuracy and to aline the tubes 29 as by a suitable frame or guide, as no particular precision is required for forming the weld 31.

If the weld 33 results in a deposit of metal on the opposite plane faces of the center plate 14 adjacent thereto, clearance for such deposit can be easily and cheaply provided by rough grinding away of portions of the plates 13 immediately adjacent to the weld to afford the necessary clearance as shown at 34. This does not affect the clamping of the glass plates 17, but it does permit the use of thick, powerful tubes 24, and the formation of a large weld without being unduly limited by the correspondingly reduced thickness of the plates 14 at the counterbores 32. Such clearance 34 avoids the need for increasing the small clearance provided between the plates 13 and 14 as shown in Fig. 2.

Preferably the center plates 14 are thus interconnected and provided with the connections 23 as shown in Fig. 4, after the gauge units 11 may be assembled by applying the gaskets 18, the glass plates 17, the cover plates 13 and the bolts 20. This completes the gauge 10. It will be apparent that the holes for the bolts 20 will have been drilled in the plates 14 before or after the connections 23 have been applied.

It will now be clear that the gage 10 provides a plurality of interchangeable gage units or parts thereof, with center plates 14 lying in a common plane and projecting beyond the water level chambers 16 to provide horizontal alined passages 22 for the fittings 23, whereby the gauge 10 can be mounted by being engaged with the unions of the usual shut-off fittings on the water column of a boiler. Accurate alinement of the nipples 29 is obtained without requiring any precision in the positioning or securement of the tubes 24 or of the nipples 29 in relation to said tubes. Consequently, the precision work in the gauge plates 13, 14 is limited to the surfaces that bear on the glass plates 17 at the opposite faces thereof. Hence a simple, cheap and efficient gauge 10 is provided, and one which is highly compact, especially as the nipples 29 need project only very little beyond the ends of the gage, so that a relatively large gauge can be mounted in a limited space. Threaded connections at the gauge units with difficult alining problems are avoided, nor need the shut-off valves be assembled as special parts of the gauge itself.

I claim:

1. An offset flat type water level gauge, including a plurality of laminated gauge units each including a central plate having a longitudinal passage forming a water level chamber, tubes interconnecting said passages so that said units are in circulatory relation to each other, said tubes being at the upper and lower ends of said units in the plane of said plates and at right angles thereto with the ends of the tubes being welded to said plates, each tube having an opening intermediate of its ends, and other tubes welded to the first mentioned tubes at the respective openings thereof, whereby the gauge is adapted to be connected to a boiler.

2. An offset flat type water level gauge wherein a plurality of gauge units are provided each having window plates and an intermediate plate having a vertical passage, a part of which forms a liquid level chamber, including said intermediate plates, each having integral portions providing horizontal passages connected to the vertical passage at the ends thereof, straight bar tubes interconnecting the horizontal passages at the different ends of the intermediate plates, and being welded to the latter, said tubes each having a central opening at a side thereof, and a nipple welded to each tube at said opening thereof whereby the gauge is operatively mounted.

3. An offset flat type water level gauge comprising a plurality of flat gauge units at different elevations each having a central plate having a water level chamber, each central plate projecting well beyond its chamber so that like ends of the central plates are at the same elevation, each plate having vertical passages therein connected to its chamber, both plates having alined horizontal passages for their vertical passages at the upper and lower ends thereof, and a T-fitting at each end of the gauge having a short horizontal section welded at its ends to said plates and a vertical section welded to the horizontal section, said fittings lying between the plates and in the plane thereof and constituting connections for mounting the gauge and for connecting the gauge units in circulatory relation to each other.

EUGENE ERNST.